(12) United States Patent
Randall et al.

(10) Patent No.: US 6,370,853 B1
(45) Date of Patent: Apr. 16, 2002

(54) DRIVE SYSTEM FOR CORN HEADER ROW UNITS

(75) Inventors: Lee W. Randall, Park View, IA (US); John L. Vande Wiele, Moline, IL (US)

(73) Assignee: Case Corporation, Racine, WI (US)

(*) Notice: Subject to any disclaimer, the term of this patent is extended or adjusted under 35 U.S.C. 154(b) by 0 days.

(21) Appl. No.: 09/418,162

(22) Filed: Oct. 13, 1999

(51) Int. Cl.[7] .............................................. A01D 45/02
(52) U.S. Cl. ........................................... 56/14.2; 56/80
(58) Field of Search ................................ 56/98, 62, 76, 56/80, 84, 94, 66, 69, 75, 78, 82, 88, 93, 106, 108, 14.2

(56) References Cited

U.S. PATENT DOCUMENTS

| | | |
|---|---|---|
| 1,890,465 A | 12/1932 | Krieg |
| 2,554,198 A | 5/1951 | Kuhlman |
| 2,560,801 A | 7/1951 | Kuhlman |
| 2,771,731 A | 11/1956 | Heth et al. |
| 2,777,273 A | 1/1957 | Heth et al. |
| 3,589,110 A | 6/1971 | Schreiner et al. |
| 3,759,021 A | 9/1973 | Schreiner et al. |
| 4,204,387 A * | 5/1980 | Eistert et al. ............... 56/98 |
| 4,227,366 A | 10/1980 | Pucher |
| 4,269,017 A | 5/1981 | deBuhr et al. |
| 4,434,606 A | 3/1984 | Rhodes et al. |
| 4,791,778 A | 12/1988 | Wilson |
| 5,099,635 A * | 3/1992 | Butkovich et al. ........... 56/13.8 |
| 5,527,218 A * | 6/1996 | Van den Bossche et al. .... 460/204 |
| 5,584,167 A * | 12/1996 | Hamada et al. ............... 56/11.4 |
| 5,704,202 A | 1/1998 | Calmer |

* cited by examiner

Primary Examiner—Robert E. Pezzuto
Assistant Examiner—Meredith C Petravick

(57) ABSTRACT

A drive system for a corn harvesting header assembly on a combine. A power take-off shaft on the front end of the combine feeder assembly is drivingly connected to the header assembly line shaft by a coupler shaft.

9 Claims, 6 Drawing Sheets

DRIVE SYSTEM FOR CORN HEADER ROW UNITS

FIELD OF THE INVENTION

The invention relates in general to agricultural combines. It relates particularly to a combine with a corn harvesting header assembly.

BACKGROUND OF THE INVENTION

It is conventional in combines fitted with corn harvesting header assemblies to employ a sprocket and chain drive for the line shaft which drives each of the individual row harvesting units in a header assembly. A drive sprocket on a power jack shaft off the combine feeder is connected by a drive chain to a driven sprocket on the header assembly. The driven sprocket is, in turn, conventionally connected to the line shaft, either directly or indirectly. One example of this type of drive system is illustrated and described in Schreiner et al. U.S. Pat. No. 3,759,021. Another is illustrated and described in Pucher U.S. Pat. No. 4,227,366.

This type of drive system, already long in use on corn harvesting combines, is relatively expensive to maintain, although it has served well for many years. Chain and belt components must be replaced frequently because of wear and damage. Dust and dirt accumulate rapidly in the chains, belts, sprockets and pulleys, accelerating wear. Development of an improved drive system has long been considered but, to this date, never realized.

SUMMARY OF THE INVENTION

It is an object of the present invention to provide an improved drive system for the row units of a corn harvesting header assembly on a combine.

It is another object to provide an improved drive system of the aforedescribed character which eliminates the need for sprockets, pulleys, drive chains and drive belts in a row unit drive system.

It is still another object to provide an improved drive system for the row units of a corn harvesting header assembly wherein the drive connection from the combine to the row units can be made anywhere along the line shaft which drives each of the row units.

It is yet another object to provide an improved row unit drive system for a corn harvesting header assembly wherein gearbox loads are transmitted to the combine frame and bending loads on the line shaft(s) are minimized.

The foregoing and other objects are realized in a drive system which includes a right angle gearbox connection to the jack-shaft on the combine feeder. The right angle gear set has an output coupler shaft extending forwardly of the combine for a predetermined distance. It provides the input to a Tee gear set between two row unit drive gearboxes. The right angle gear set and Tee gear may be contained in a simple housing or gearbox, which is the preferred construction, or they may be contained in separate housings. In the latter case, the two gearboxes are also connected by a mounting bracket which holds the gear boxes in alignment, transmits gearbox loads to the combine frame and shields the coupler shaft.

The line shaft normally extends across the width of the header assembly and passes through each corn head row unit drive gear box in doing so, crossing the Tee in the Tee gear set. The line shaft is then driven as a function of PTO shaft output, from the right angle gear set through the Tee gear set. Where wider header assemblies are involved, two axially aligned line shafts may be employed. In such case, they may be coupled and driven by a single drive system embodying the invention or, in the alternative, by two such drive systems.

BRIEF DESCRIPTION OF THE DRAWINGS

The invention, including its construction and method of operation, is illustrated more or less diagrammatically in the drawings, in which.

DESCRIPTION OF THE PREFERRED EMBODIMENT

Figure 1:
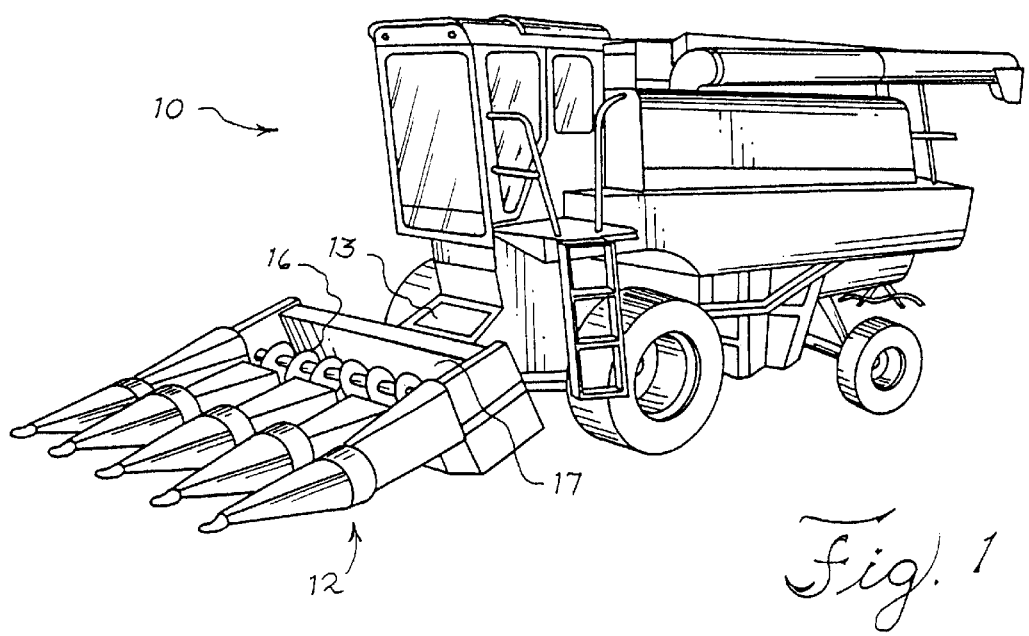
FIG. 1 is a perspective view of an agricultural combine and corn harvesting header assembly including a drive system embodying features of the present invention.

Referring now to the drawings, and particularly to FIG. 1, an agricultural combine of generally conventional construction is seen generally at 10. A corn harvesting header assembly 12 is mounted on the combine 10, cantilevered in front of it and connected to the combine by a feeder assembly 13.

The header assembly 12 shown here is designed to harvest four rows of corn simultaneously. Ears of corn are stripped from each of the four rows and carried by an auger 16 in the trough 17 to the feeder assembly 13. The feeder assembly 13 carries the collected ears rearwardly and upwardly into the threshing assembly (not shown) in the body of the combine 10.

Figure 2:
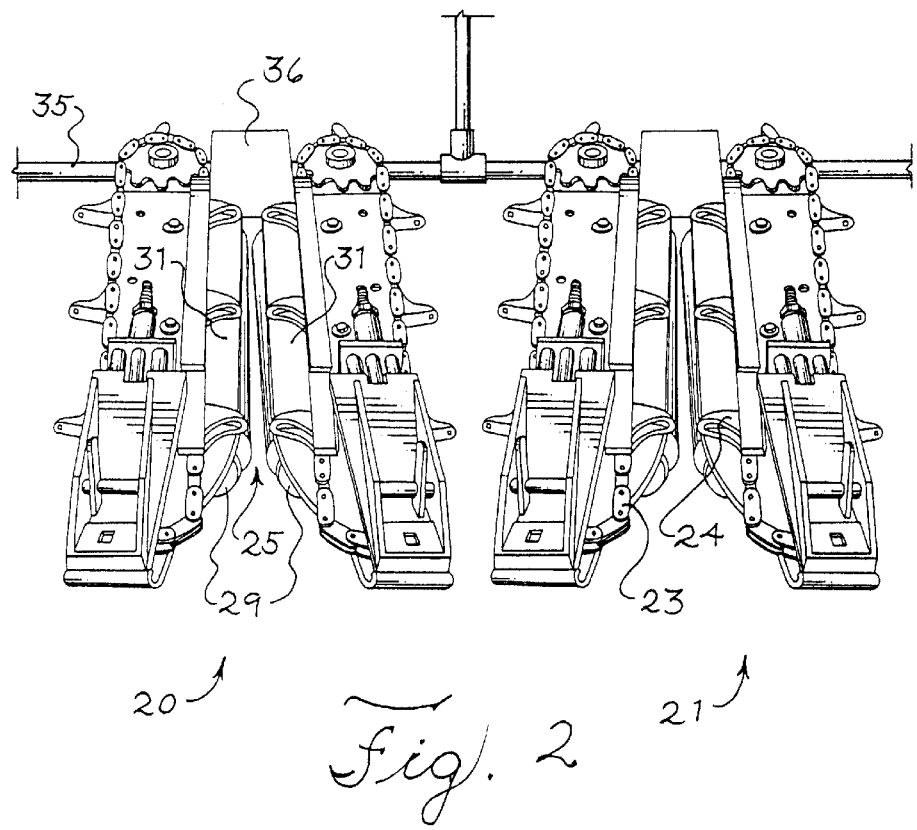
FIG. 2 is a front view of a pair of corn head row units in the header assembly illustrated in FIG. 1.

Referring now also to FIG. 2, two corn row units 20 and 21 of conventional construction are illustrated. The row units 20 and 21 are arranged in side-by-side relationship in the header assembly 12. Although only two are shown here, the header assembly 12 may have any number of such units, in side-by-side relationship, across its width. Each is constructed and operates in an identical manner, so corresponding reference numerals are used and only unit 20 is described.

In the unit 20, corn stalks are trapped by the gathering chains 23 which carry gathering fingers 24 and draw the stalks into the slot 25 formed by parallel snapping rolls 29. The snapping rolls 29 pull the corn stalks downwardly through the slot 25 and the ears of corn are stripped off of the stalks by stripper plates 31 as the stalks are pulled downwardly between them. The gathering fingers 24 on the chain 23 carry the stripped ears of corn rearwardly to the trough 17 where they are deposited and conveyed by the augur 16 in the manner previously referred to.

The gathering chains 23 and snapping rolls 29 are driven by a rotating line shaft 35 which extends transversely of the units 20 over the width of the header assembly 12. The line shaft 35 is drivingly connected to each row unit 20 through a gear box 36.

Figure 3:
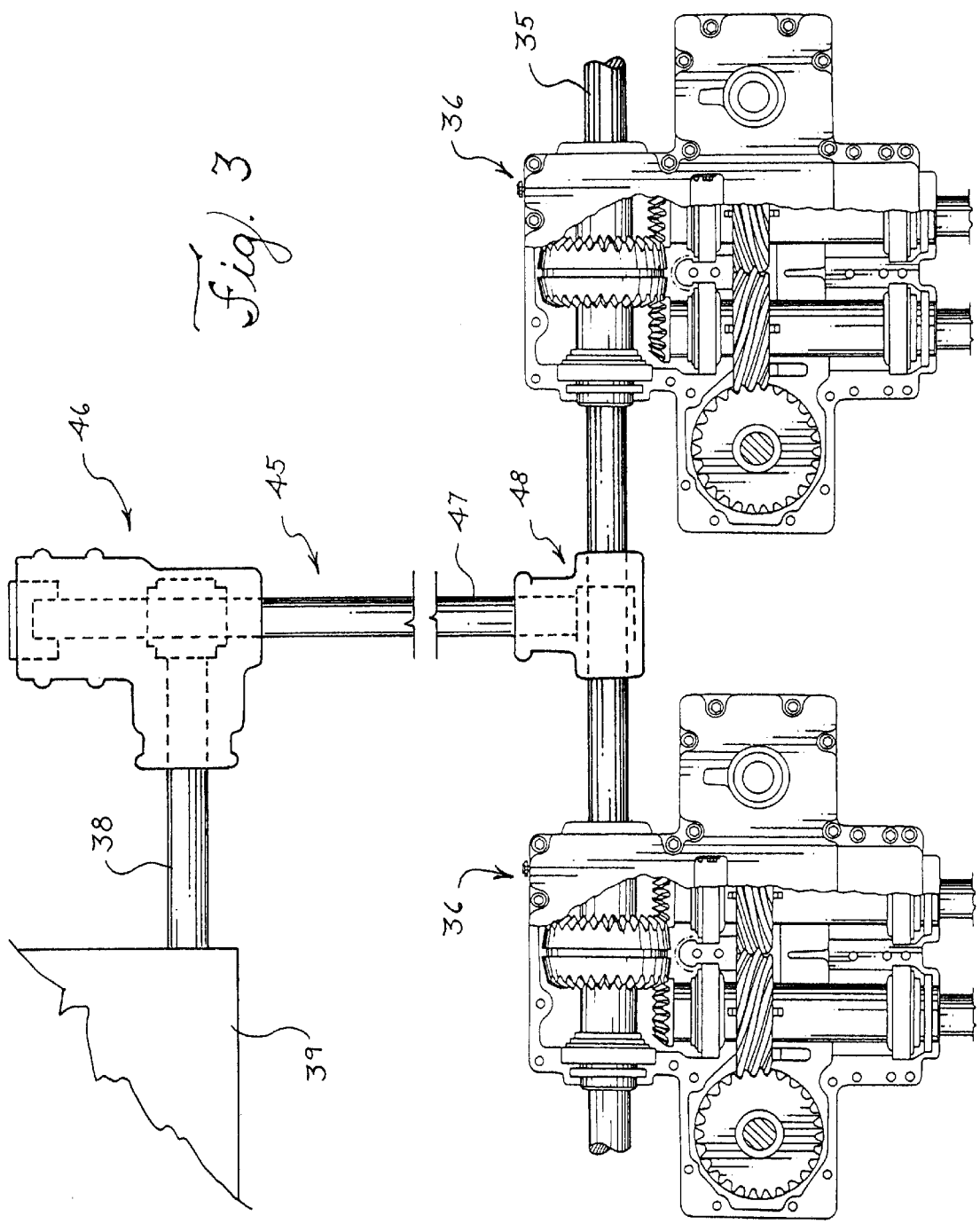
FIG. 3 is an enlarged top plan view, partially in section, of a basic form of drive system embodying features of the invention, with parts removed.

Referring now to FIG. 3, the line shaft 35 is driven by the power take-off (PTO) shaft 38 on the front end 39 of the feeder assembly 13 in the combine 10, through a drive system 45 embodying features of a basic form of the invention. The drive system 45 comprises a conventional right angle gear box 46, a coupler shaft 47 and a conventional Tee gear box 48. The Tee gear box 48 is mounted on the line shaft 35 of the header assembly 12, intermediate two adjacent row unit gear boxes 36. The coupler shaft 47 extends forwardly of the combine 10 from the right angle gear box 46 to the Tee gear box 48.

Figure 4:
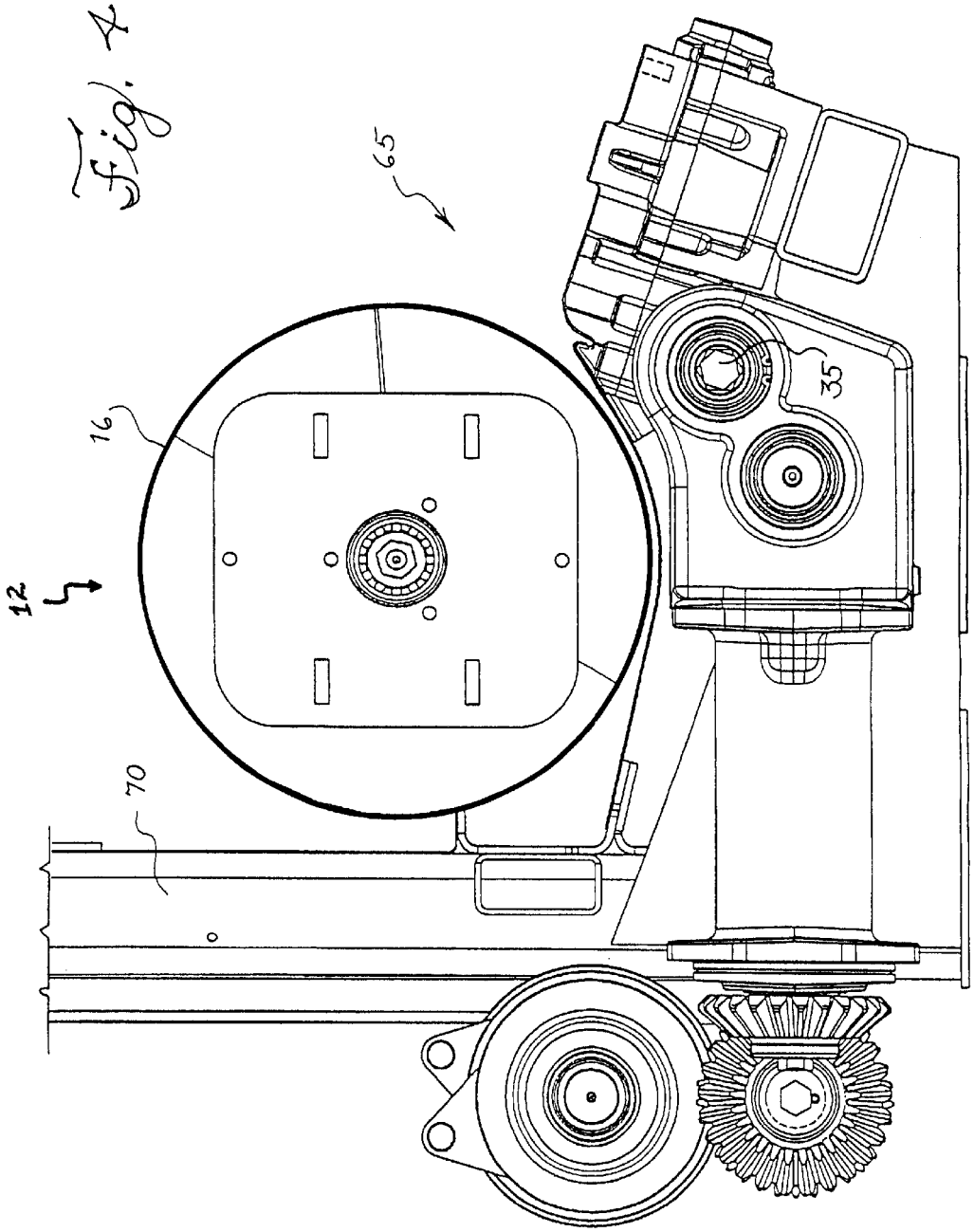
FIG. 4 is a side view of a preferred form of drive system as it relates to a header assembly, with some parts removed and some added.
Figure 5:
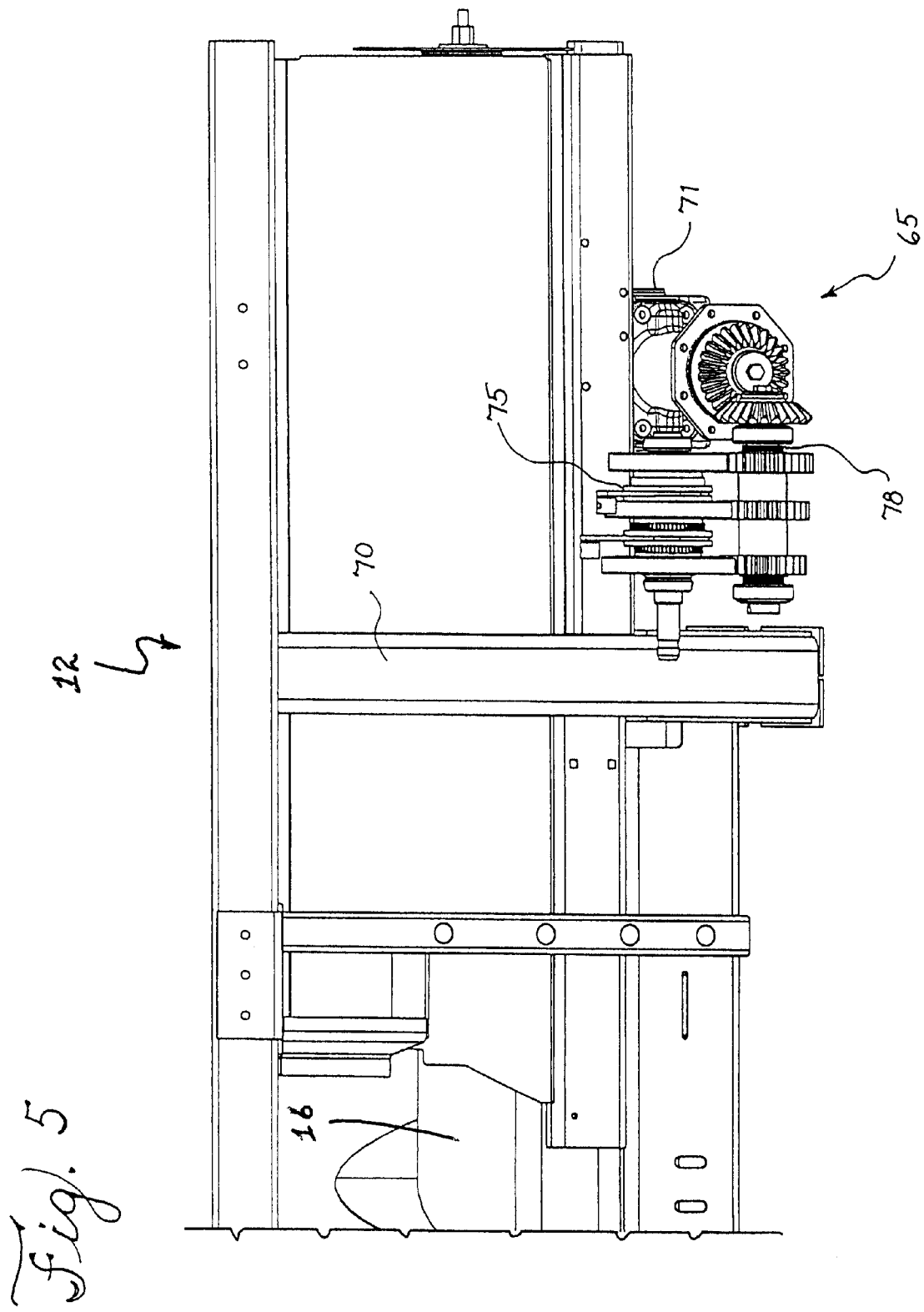
FIG. 5 is a rear view of the system seen in FIG. 4.

Referring now to FIGS. 4–8, a preferred form of the drive system embodying features of the present invention is seen at 65 in association with a corn harvesting header assembly 12. FIGS. 4 and 5 show the header assembly 12 and the auger 16 which it incorporates.

In FIGS. 4 and 5, the frame 70 for the header assembly 12 is also partially shown. The drive system 65 is pivotally suspended beneath that frame 70, at 71, and extends forwardly, under the auger 16, to its connection with line shaft 35.

Figure 6:
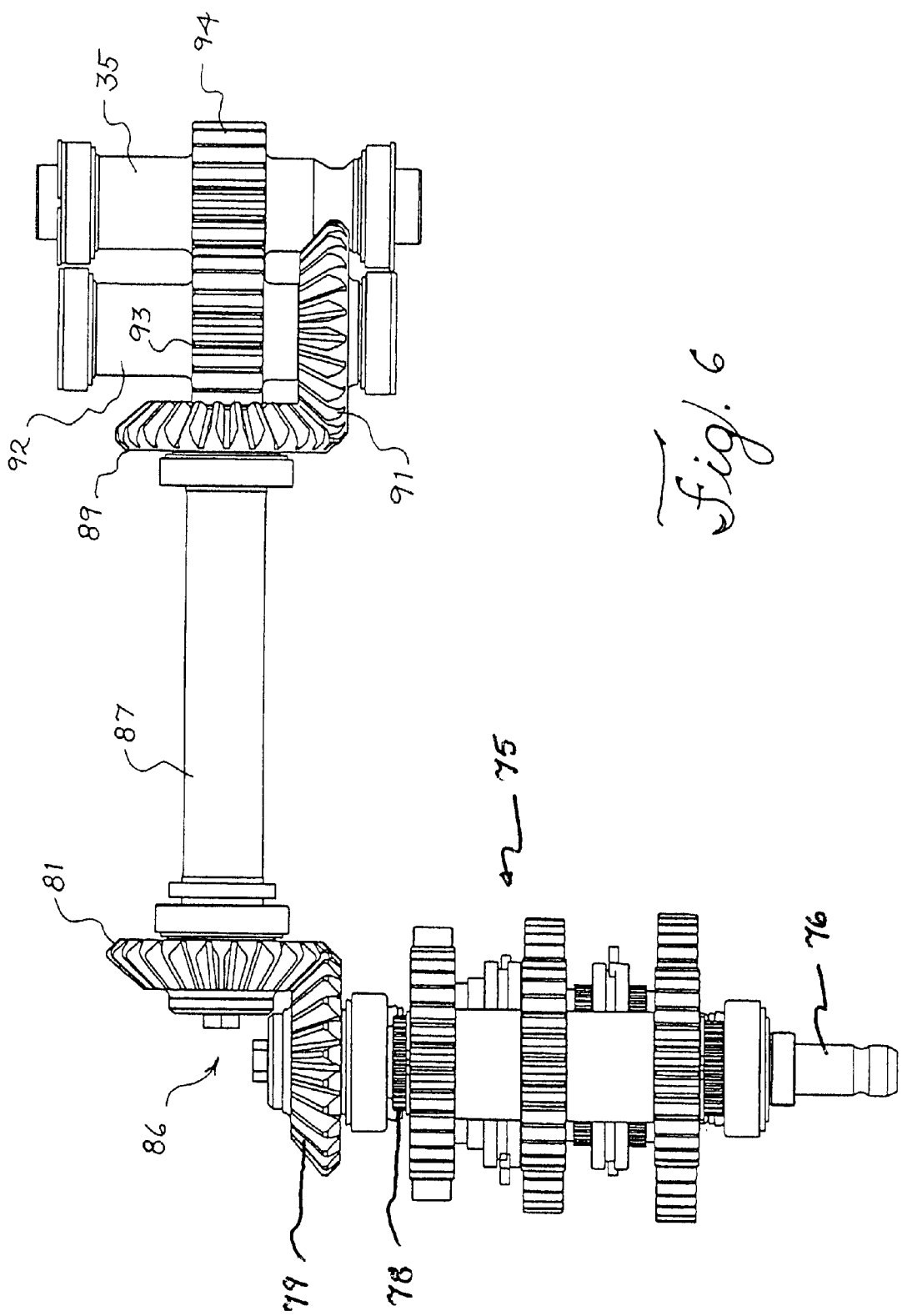
FIG. 6 is a top plan view of the gear arrangement in the preferred form of drive system, a gear arrangement which could also be used in the basic form.

Referring now olso to FIGS. 4–6, the system 65 includes a selectable speed gear set 75 having an input shaft 76. The input shaft is designed to be coupled to the PTO shaft 38 on the feeder assembly (not shown) of the combine. The selectable speed gear set 75 includes an output shaft 78 which mounts a bevel gear 79 on its free end.

The bevel gear 79, together with a mating bevel gear 81, forms a right angle gear set 86 in the system 65. A coupler shaft 87 extends forwardly from the bevel gear 81 to a Tee gear set 88. The Tee gear set 88 includes a bevel gear 89 on the front end of the shaft 87, and a mating bevel gear 91 mounted on a transverse shaft 92 in the box 88. The transverse shaft 92, in turn, carries a gear 93 which mates with a gear 94 on the line shaft 35.

Figure 7:
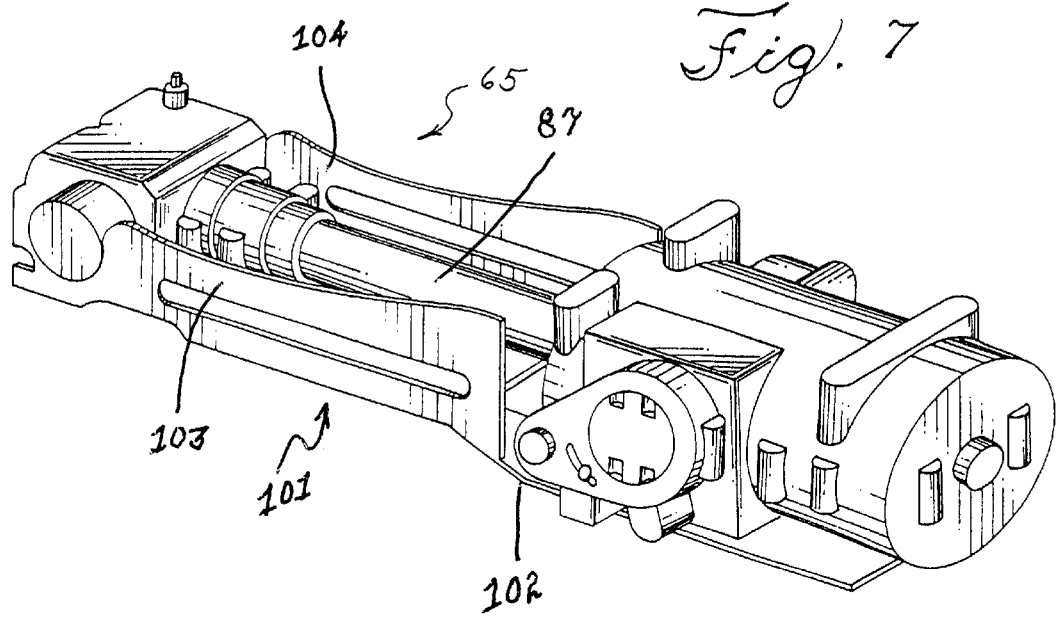
FIG. 7 is a perspective view of the preferred form of drive system embodying features of the present invention.
Figure 8:
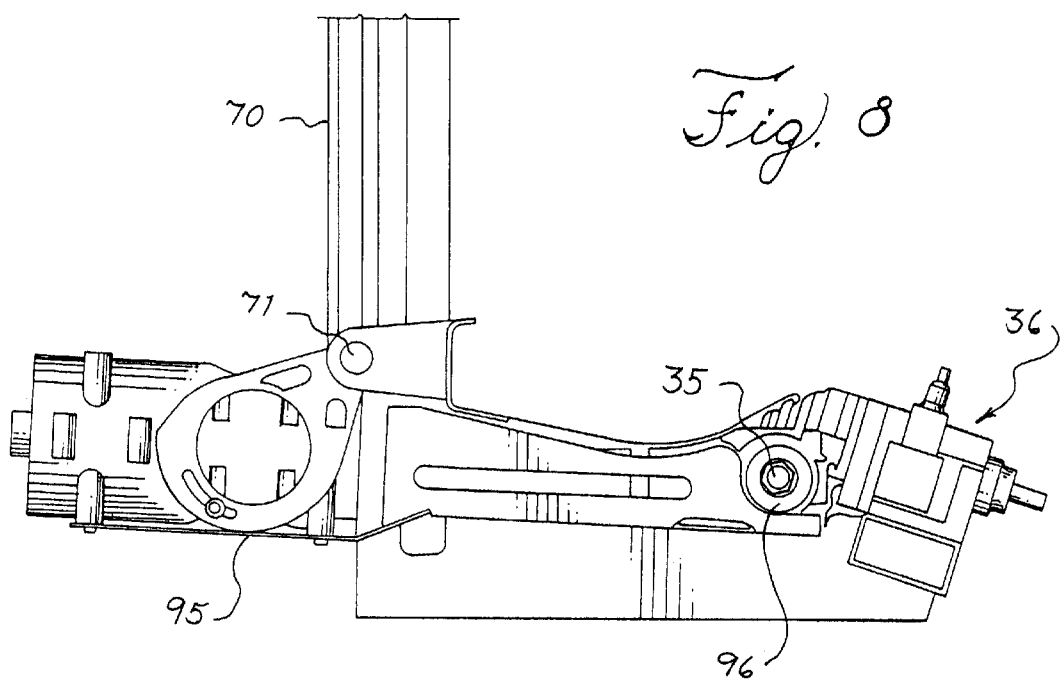
FIG. 8 is a side view of the preferred form of drive system seen in FIG. 7, as connected to the header frame.

Turning now to FIGS. 7 and 8, the system 65 is shown with the aforedescribed gears mounted in respective casings; the casing 95 for the right angle gear set 86 and the casing 96 for the Tee gear set 88. The casing 95 mounts a pivot pin which establishes the pivot 71 hereinbefore referred to.

The system 65 includes an elongated mounting bracket 101 which rigidly interconnects the casings 95 and 96. The bracket 101 includes a floor plate 102 and upstanding wall plates 103 and 104. The wall plates 103 and 104 bracket the shaft 87, protecting it. The bracket 101 serves to transfer loads from the casing 96 to the casing 95 without subjecting the shaft 87 to excessive stress.

While preferred embodiments of the invention have been described, it should be understood that the invention is not so limited, and modifications may be made without departing from the invention. The scope of the invention is defined by the appended claims, and all devices that come within the meaning of the claims, either literally or by equivalence, are intended to be embraced therein.

What is claimed is:

1. A corn harvesting header assembly for an agricultural combine, said combine having a feederhouse extending forwardly therefrom in the normal direction of travel, said feederhouse including a PTO shaft extending outwardly therefrom in a direction generally transverse to said normal direction of travel, said header assembly comprising:

a) a frame elongated in the direction transverse to said normal direction of travel, said frame containing an elongated auger and a line shaft both extending longitudinally of said frame, said frame further having a bottom, a generally opposing top, a front and a generally opposing back, said frame adapted to be attached to said feederhouse at the said back of said frame so that crop material gathered by said header may b e fed into said feederhouse and then to said combine, said line shaft closer than said auger to said bottom and said front;

b) a right angle gear set contained in a first casing pivotally connected to the back of said frame and adapted to be drivingly connected to said PTO shaft;

c) a second casing containing a tee gear set in front of said auger;

d) a coupler shaft extending forwardly from said first casing, under said auger, to said second casing;

e) said line shaft extending into said second casing and adapted to be driven from said PTO shaft through said right angle gear set;

f) an elongated mounting bracket rigidly interconnecting said first casing and said second casing and extending under said auger, said mounting bracket at least partially enclosing said coupler shaft; and g) a plurality of row units drivingly connected to said line shaft, each by a separate gearbox, each said gearbox selectively movable along said line shaft.

2. The header assembly of claim 1 wherein said elongated mounting bracket at least partially encloses said coupler shaft.

3. The header assembly of claim 2 wherein:

a) said elongated mounting bracket comprises a floor plate with opposing upstanding sidewall plates; and b) said floor plate is underlying said coupling shaft and said wall plates at least partially enclose said coupler shaft.

4. A corn harvesting header assembly for an agricultural combine, said combine having a feederhouse extending forwardly therefrom in the normal direction of travel, said feederhouse including a PTO shaft extending outwardly therefrom in a direction generally transverse to said normal direction of travel, the improvement comprising:

a) a frame elongated in the direction transverse to said normal direction of travel, said frame containing an elongated auger and a line shaft both extending longitudinally of said frame, said frame further having a bottom, a generally opposing top, a front and a generally opposing back, said frame adapted to be attached to said feederhouse at the said back of said frame so that crop material gathered by said header may be fed into said feederhouse and then to said combine, said line shaft closer than said auger to said bottom and said front;

b) a right angle gear set contained in a first casing pivotally connected to the back of said frame and adapted to be drivingly connected to said PTO shaft;

c) a second casing containing a tee gear set in front of said auger;

d) a coupler shaft extending forwardly from said first casing, under said auger, to said second casing;

e) said line shaft extending into said second casing and adapted to be driven from said PTO shaft through said right angle gear set;

f) an elongated mounting bracket rigidly interconnecting said first casing and said second casing and extending under said auger, said mounting bracket at least partially enclosing said coupler shaft; and g) a plurality of row units drivingly connected to said line shaft, each by a separate gearbox, each said gearbox selectively movable along said line shaft.

5. The header assembly of claim 4 wherein said elongated mounting bracket at least partially encloses said coupler shaft.

6. The header assembly of claim 5 wherein:
   a) said elongated mounting bracket comprises a floor plate with opposing upstanding sidewall plates; and
   b) said floor plate is underlying said coupling shaft and said wall plates at least partially enclose said coupler shaft.

7. The combination of a corn harvesting header assembly and an agricultural combine comprising:
   a) an agricultural combine having a wheel-supported main frame, an operator's cab on said main frame, a feederhouse extending forwardly from said main frame in the normal direction of travel of said combine,
   b) said feederhouse including a PTO shaft extending outwardly therefrom in a direction generally transverse to said normal direction of travel,
   c) a header frame elongated in the direction transverse to said normal direction of travel, said header frame containing an elongated auger and a line shaft both extending longitudinally of said header frame, said header frame further having a bottom, a generally opposing top, a front and a generally opposing back, said header frame adapted to be attached to said feederhouse at the said back of said header frame so that crop material gathered by said header may be fed into said feederhouse and then to said combine, said line shaft closer than said auger to said bottom and said front;
   d) a right angle gear set contained in a first casing pivotally connected to the back of said header frame and adapted to be drivingly connected to said PTO shaft;
   e) a second casing containing a tee gear set in front of said auger;
   f) a coupler shaft extending forwardly from said first casing, under said auger, to said second casing;
   g) said line shaft extending into said second casing and adapted to be driven from said PTO shaft through said right angle gear set;
   h) an elongated mounting bracket rigidly interconnecting said first casing and said second casing and extending under said auger, said mounting bracket at least partially enclosing said coupler shaft; and
   i) a plurality of row units drivingly connected to said line shaft, each by a separate gearbox, each said gearbox selectively movable along said line shaft.

8. The combination of claim 7 wherein said elongated mounting bracket at least partially encloses said coupler shaft.

9. The combination of claim 8 wherein:
   a) said elongated mounting bracket comprises a floor plate with opposing upstanding sidewall plates; and
   b) said floor plate is underlying said coupling shaft and said wall plates at least partially enclose said coupler shaft.

* * * * *